(12) United States Patent
Yoshizawa

(10) Patent No.: US 9,691,001 B2
(45) Date of Patent: Jun. 27, 2017

(54) IMAGE PROCESSING DEVICE AND IMAGE PROCESSING METHOD

(71) Applicant: Konica Minolta, Inc., Chiyoda-ku, Tokyo (JP)

(72) Inventor: Masanori Yoshizawa, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 104 days.

(21) Appl. No.: 14/843,205

(22) Filed: Sep. 2, 2015

(65) Prior Publication Data

US 2016/0063346 A1    Mar. 3, 2016

(30) Foreign Application Priority Data

Sep. 3, 2014   (JP) ................................. 2014-178640

(51) Int. Cl.
| | |
|---|---|
| *G06K 9/50* | (2006.01) |
| *G06K 9/46* | (2006.01) |
| *G06K 9/32* | (2006.01) |
| *G06T 7/33* | (2017.01) |
| *G06K 9/48* | (2006.01) |

(52) U.S. Cl.
CPC ............ *G06K 9/4604* (2013.01); *G06K 9/32* (2013.01); *G06K 9/4638* (2013.01); *G06K 9/4671* (2013.01); *G06T 7/337* (2017.01); *G06K 2009/4666* (2013.01); *G06K 2009/485* (2013.01)

(58) Field of Classification Search
CPC ...... G06K 9/32; G06K 9/4604; G06K 9/4638; G06K 9/4671; G06K 2009/4666; G06K 2009/485; G06T 7/337

USPC .......................................... 382/103, 190, 201
See application file for complete search history.

(56) References Cited

U.S. PATENT DOCUMENTS

| | | |
|---|---|---|
| 2013/0223683 A1 | 8/2013 | Jiang et al. |
| 2015/0213610 A1* | 7/2015 | Guo ..................... G06T 7/0081 |
| | | 382/173 |

FOREIGN PATENT DOCUMENTS

| | | |
|---|---|---|
| JP | 2007-156626 A | 6/2007 |
| JP | 2014-132377 A | 7/2014 |

OTHER PUBLICATIONS

The extended European Search Report issued on Feb. 4, 2016, in corresponding European Patent Application No. 15182854.8-1901 (8 pgs).

(Continued)

*Primary Examiner* — Daniel Mariam
(74) *Attorney, Agent, or Firm* — Buchanan Ingersoll & Rooney PC

(57) ABSTRACT

An image processing device includes a feature point detecting section which detects a feature point from an image and which includes a ternarizing section and a determining section. The ternarizing section sets each pixel of the image as a target pixel and inputs pixel values of the target pixel and surrounding pixels. The ternarizing section changes each of the pixel values of the surrounding pixels to one of three signal values which represent that brightness of a surrounding pixel is brighter or darker than or similar to brightness of the target pixel. When the number of consecutive surrounding pixels having the same signal value is equal to or greater than a threshold, the determining section determines the target pixel as the feature point.

9 Claims, 4 Drawing Sheets

(56) References Cited

OTHER PUBLICATIONS

Office Action (Notification of Reasons for Refusal) issued on Nov. 22, 2016, by the Japanese Patent Office in corresponding Japanese Patent Application No. 2014-178640 and English translation of the Office Action. (7 pages).
Fujiyoshi et al., "Gradient-based Image Local Features", Journal of JSPE, The Japan Society for Precision Engineering, (2011), vol. 77, No. 12, pp. 1109-1116.
Shengcai Liao et al., "Modeling Pixel Process with Scale Invariant Local Patterns for Background Subtraction in Complex Scenes", 2010 IEEE Conference on Computer Vision and Pattern Recognition (CVPR), Jun. 13-18, 2010, pp. 1301-1306.
European Office Action dated Mar. 1, 2017 issued in corresponding European Patent Appln. No. 15182854.8 (5 pages).

* cited by examiner

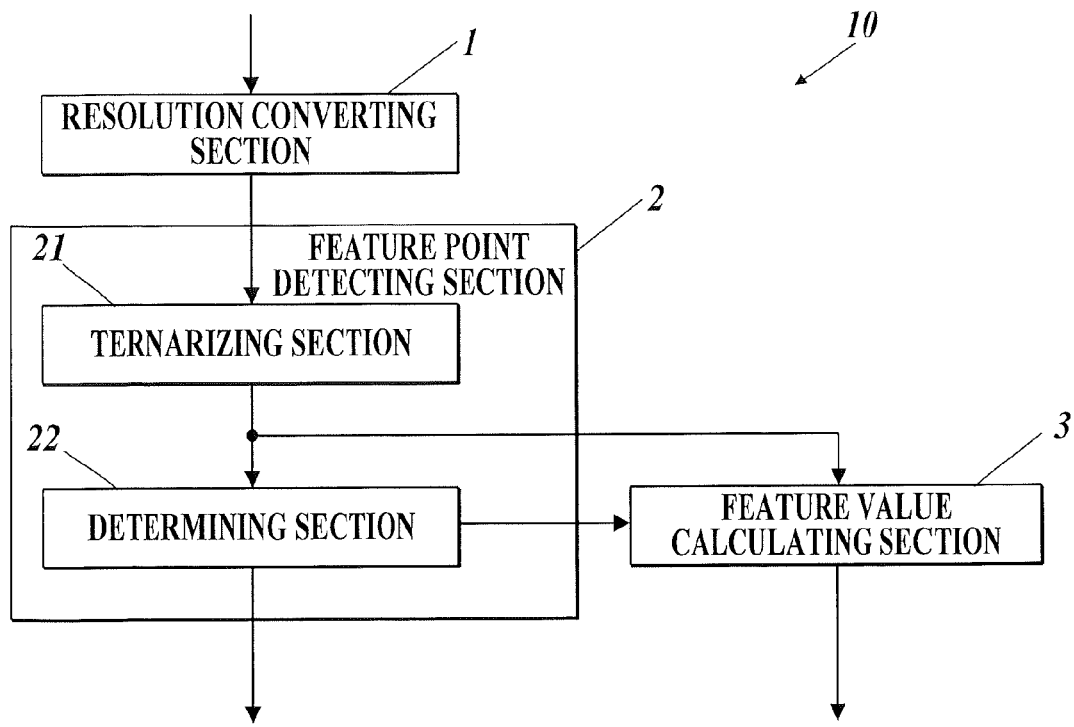
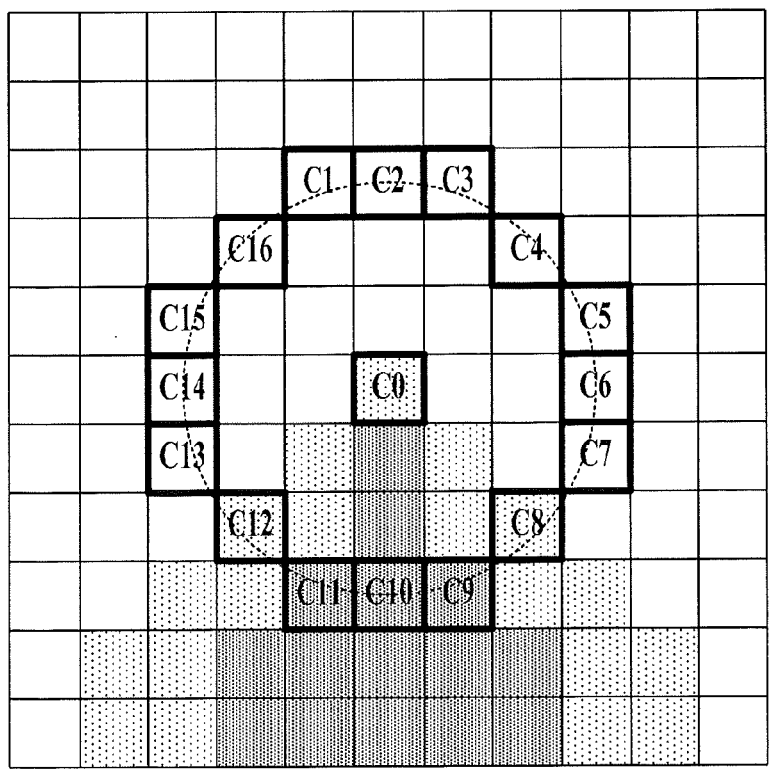

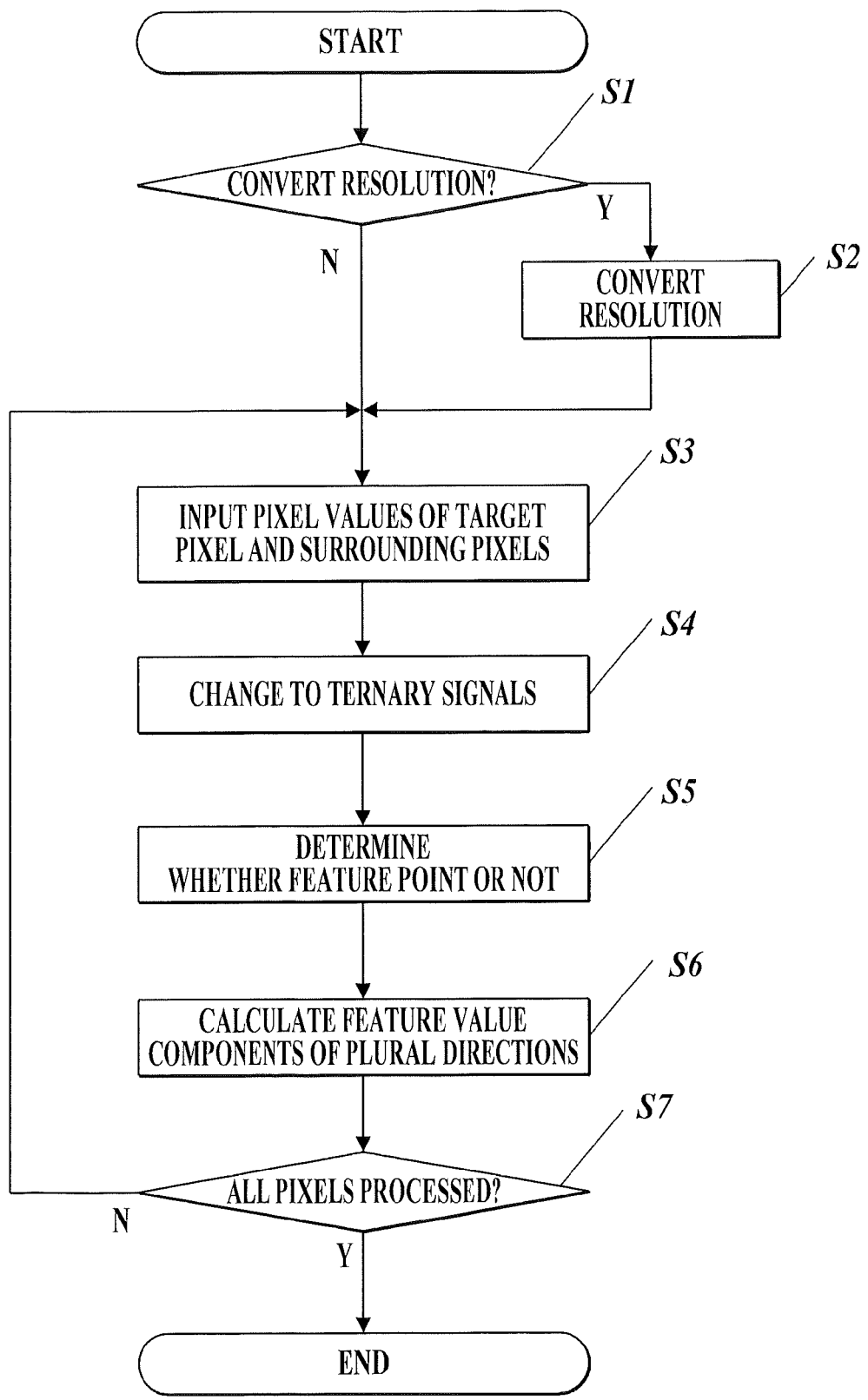

IMAGE PROCESSING DEVICE AND IMAGE PROCESSING METHOD

BACKGROUND OF THE INVENTION

1. Field of the Invention

The present invention relates to an image processing device and an image processing method.

2. Description of Related Art

Image defects such as errors, missing and blots have been detected by reading a printed sheet and checking the obtained image against a checked reference image.

In order to reduce false detection due to a slight displacement of an image, defects have been detected such that a feature point having a unique image characteristic is detected from both images, and the feature value thereof representing the image characteristic is checked.

For example, an edge is detected from an image to be checked as a feature point, and the edge direction and edge intensity of the edge are determined as the feature value (e.g. see JP 2007-156626A).

On the other hand, the FAST (features from accelerated segment test) is known as a method that detects a corner as a feature point (e.g. see Machine learning for high-speed corner detection, Edward Rosten, Tom Drummond). The FAST utilizes machine learning so that a software can detect a feature point at a high efficiency and a high accuracy. That is, the FAST is optimized in order to increase the speed of the software detection.

However, determining the feature value of the edge direction requires filtering operations individually for vertical, horizontal and diagonal directions with respective edge detecting filters, which results in the increased number of operations. Further, since the feature value of the edge intensity has large data volume, a large storage volume is required for storing the feature value, which results in an increased cost. Furthermore, another problem is that false detection is likely to be increased when a noise is included in the surrounding pixels of a target pixel.

In contrast, the FAST is less influenced by a noise since a feature point is determined based on the surrounding pixels that are located in a circular pattern at a distance of several pixels from a target pixel. Accordingly, a feature point having a unique image characteristic can be determined at a high accuracy. However, the FAST is only a technique for detecting a feature point. To obtain a feature value, an additional step of calculating a unique feature value of the feature point is required.

SUMMARY OF THE INVENTION

It is an object of the present invention to efficiently calculate the feature value that has small data volume and provides high accuracy of detecting a target image part.

In order to realize the above object, according to a first aspect of the present invention, there is provided an image processing device, including:
  a feature point detecting section which detects one or more feature point from an image; and
  a feature value calculating section which calculates a feature value of the feature point detected by the feature point detecting section,
  wherein the feature point detecting section includes:
    a ternarizing section which sets a pixel of the image as a target pixel and inputs pixel values of the target pixel and surrounding pixels of the target pixel and which changes each of the pixel values of the surrounding pixels to one of three signal values based on whether (i) the pixel value of a surrounding pixel is higher than the pixel value of the target pixel by a first threshold or more, (ii) the pixel value of a surrounding pixel is lower than the pixel value of the target pixel by the first threshold or more, or (iii) a difference in the pixel value between the target pixel and a surrounding pixel is less than the first threshold, in which the three signal values represent that brightness of a surrounding pixel is brighter or darker than or similar to brightness of the target pixel; and
    a determining section that determines the target pixel as the feature point when the number of consecutive surrounding pixels having a same signal value representing brighter or darker determined by the ternarizing section among the surrounding pixels is equal to or greater than a second threshold, and
  wherein the feature value calculating section calculates feature value components of a plurality of directions from the target pixel as the feature value of the target pixel by using the signal values of surrounding pixels in the plurality of directions, in which each of the feature value components is one of the three signal values.

According to a second aspect of the present invention, there is provided an image processing method, including steps of:
  (a) detecting one or more feature point from an image; and
  (b) calculating a feature value of the feature point detected in the step (a),
  wherein the step (a) includes steps of:
    (a1) setting a pixel of the image as a target pixel and inputting pixel values of the target pixel and surrounding pixels of the target pixel;
    (a2) changing each of the pixel values of the surrounding pixels to one of three signal values based on whether (i) the pixel value of a surrounding pixel is higher than the pixel value of the target pixel by a first threshold or more, (ii) the pixel value of a surrounding pixel is lower than the pixel value of the target pixel by the first threshold or more, or (iii) a difference in the pixel value between the target pixel and a surrounding pixel is less than the first threshold, in which the three signal values represent that brightness of a surrounding pixel is brighter or darker than or similar to brightness of the target pixel; and
    (a3) determining the target pixel as the feature point when the number of consecutive surrounding pixels having a same signal value representing brighter or darker among the surrounding pixels is equal to or greater than a second threshold, and
  wherein in the step (b), feature value components of a plurality of directions from the target pixel are calculated as the feature value of the target pixel by using the signal values of surrounding pixels located in the plurality of directions, in which each of the feature value components is one of the three signal values.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein:

FIG. 1 is a block diagram of an image processing device according to an embodiment of the present invention, illustrating the schematic configuration thereof;

FIG. 2 illustrates an example of a target pixel and the plurality of surrounding pixels thereof;

FIG. 6 is a flowchart illustrating a process of detecting a feature point and calculating the feature value thereof in an image processing device.

DETAILED DESCRIPTION OF THE PREFERRED EMBODIMENT

Figure 3:
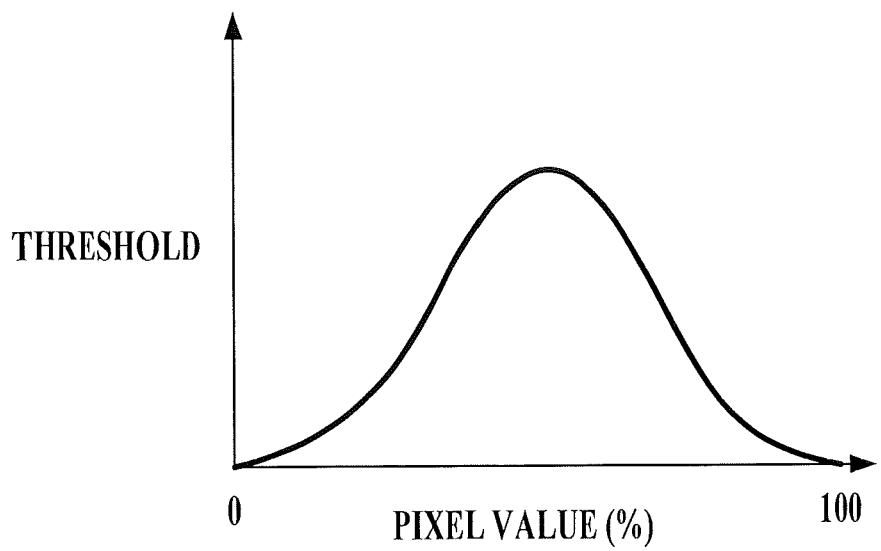
FIG. 3 illustrates an example of a characteristic curve used for determining a first threshold.

Hereinafter, an embodiment of the image processing device and the image processing method of the present invention will be described referring to the drawings.

FIG. 1 is a block diagram of an image processing device 10 according to the present embodiment, illustrating the schematic configuration thereof based on the functionalities.

The image processing device 10 detects one or more feature point from an image and outputs a calculated feature value of the feature point. As well as characters, figures, photographs and the like of an image, other image parts having a density difference such as blots, stripes and uneven density also have their own image characteristics. Accordingly, it is possible to carry out check, pattern recognition and the like of the image by using their feature values output from the image processing device 10.

For example, in an image check, the image processing device 10 may detect image defects such as errors, missing and blots by detecting a plurality of feature points from both of an image formed on a sheet by a coloring material like a toner and a checked reference image and calculating and comparing the feature values of the detected feature points. When a pattern recognition is performed to detect, for example, a human image part, the image processing device 10 can detect a human image part in an image by detecting a plurality of feature points from the image, calculating the feature values thereof and comparing them against the feature values of feature points on a sample human image for learning, which are determined beforehand.

As illustrated in FIG. 1, the image processing device 10 includes a resolution converting section 1, a feature point detecting section 2 and a feature value calculating section 3. Each of the resolution converting section 1, the feature point detecting section 2 and the feature value calculating section 3 may be constituted by an LSI (large scale integration) with a built-in line buffer, etc., or the like.

In the following, each of the components will be described in detail.

The resolution converting section 1 converts the resolution of an input image. It is not essential to convert the resolution of an image. When the resolution is not converted, the resolution converting section 1 directly outputs the input image to the feature point detecting section 2 without any change.

The resolution converting section 1 may convert the resolution of an image according to the size of an intended image part to be detected from the image by using a feature value output from the image processing device 10. This allows efficient detection of the target image part in an image.

For example, when an image is formed on a sheet by electrophotography using a toner, a residual toner that has not been removed due to poor cleaning of a photoreceptor, a transferring body or the like may adhere to the sheet as a blot. When such blots are a target image part of the detection, the image part to be detected is a clump of toner powder with a size of approximately 0.1 mm to several mm. Changing the resolution of an image to a value within the range of 100 dpi to 300 dpi and adapting the size of an evaluation window for detecting a feature point to the size of such powder clumps makes it easier to detect a blot image part as a feature point. Therefore, the accuracy of detecting a blot image part is improved.

When a stripe with a size of several mm, periodical uneven density or the like are a target image part of the detection, changing the resolution to a value within the range of 10 dpi to 50 dpi can improve the accuracy of detecting such image parts.

The feature point detecting section 2 detects one or more feature point from the input image. When the resolution converting section 1 converts the resolution, the feature point detection section 2 detects feature points from the converted image.

As illustrated in FIG. 1, the feature point detecting section 2 includes a ternarizing section 21 and a determining section 22.

The ternarizing section 21 sets each pixel of the image as a target pixel and inputs pixel values of the target pixel and surrounding pixels thereof.

The surrounding pixels refer to pixels that are located at a distance of 2 pixels or more from the target pixel. It is preferred that the surrounding pixels are located on a circle centered on the target pixel since a feature point having a corner characteristic can be detected at a high accuracy. The radius of the circle may have any length of 2 pixels or more, but it is preferably 3 pixels long since a feature point having a corner characteristic can be detected at a high accuracy.

FIG. 2 illustrates an example of the target pixel and the surrounding pixels. In FIG. 2, the target pixel is denoted as C0, a dashed line is the circle with a radius of 3 pixels centered on the target pixel C0, and sixteen surrounding pixels on the circle are denoted as C1 to C16.

The ternarizing section 21 changes each pixel value of the surrounding pixels to one of three signal values, which represent that the brightness of a surrounding pixel is brighter or darker than or similar to that of the target pixel. This conversion is made based on whether (i) the pixel value of a surrounding pixel is higher than that of the target pixel by a first threshold or more, (ii) the pixel value of a surrounding pixel is lower than that of the target pixel by the first threshold or more, or (iii) the difference in pixel value between the target pixel and a surrounding pixel is less than the first threshold. The three signal values are 0, 1 and 2, each of which is 2-bit data. As used herein, the difference in pixel value between the target pixel and a surrounding pixel refers to the absolute value of the difference.

The conversion by the ternarizing section 21 can be expressed as follows, where $D[C0]$ is the pixel value of the target pixel C0 in FIG. 2, $Th1$ is the first threshold (a positive integer), $D[k]$ is the pixel value of the surrounding pixels C1 to C16 (where k is C1 to C16), $R[k]$ is the signal value of the surrounding pixels C1 to C16 obtained by the conversion.

If $D[C0]+Th1 \leq D[k]$, then $R[k]=0$

If $D[C0]-Th1 < D[k] < D[C0]+Th1$, then $R[k]=1$

If $D[k] \leq D[C0]-Th1$, then $R[k]=2$

In the example of FIG. 2, the surrounding pixels C8 and C12 have the same pixel value as the target pixel C0, and their pixel values $D[k]$ are each changed to the signal value R[k] of 1. The surrounding pixels C9 to C11 have a pixel value higher than the target pixel C0 by the first threshold Th1 or more, and their pixel values D[k] are each changed to the signal value R[k] of 0. The surrounding pixels C1 to C7 and C13 to C16 have a pixel value lower than the target pixel C0 by the first threshold Th1 or more, and their pixel values D[k] are each changed to the signal value R[k] of 2.

In the above-described conversion, a higher signal value is assigned to a brighter surrounding pixel relative to the target pixel. That is, the signal value "2" represents that a surrounding pixel is brighter than the target pixel, the signal value "1" represents that a surrounding pixel and the target pixel have a similar brightness, and the signal value "0" represents that a surrounding pixel is darker than the target pixel.

Alternatively, a higher signal value may be assigned to a darker surrounding pixel relative to the target pixel according to the following conversion.

If $D[C0]+Th1 \leq D[k]$, then $R[k]=2$

If $D[C0]-Th1 < D[k] < D[C0]+Th1$, then $R[k]=1$

If $D[k] \leq D[C0]-Th1$, then $R[k]=0$

In this conversion, the signal value "2" represents that a surrounding pixel is darker than the target pixel, the signal value "1" represents that a surrounding pixel and the target pixel have a similar brightness, and the signal value "0" represents that a surrounding pixel is brighter than the target pixel.

The ternarizing section 21 may determine the first threshold Th1 according to the pixel value of the target pixel. This can improve the accuracy of detecting a target image part from the image by using a feature value.

For example, when a detection target is an image part that has a density close to the maximum level and thus has a large density difference from the background, such as a solid blot on the white background, the first threshold Th1 that corresponds to the pixel value (%) of the target pixel may be determined according to the characteristic curve of FIG. 3. In the characteristic curve of FIG. 3, the determined first threshold Th1 becomes large when the pixel value is at a halftone around 50%. Since a feature point is less likely to be detected from a halftone image part with a larger first threshold Th1, the sensitivity of detecting blots can be adjusted so that an image part having a density around the maximum level is likely to be detected as a feature point as much as possible.

Figure 4:
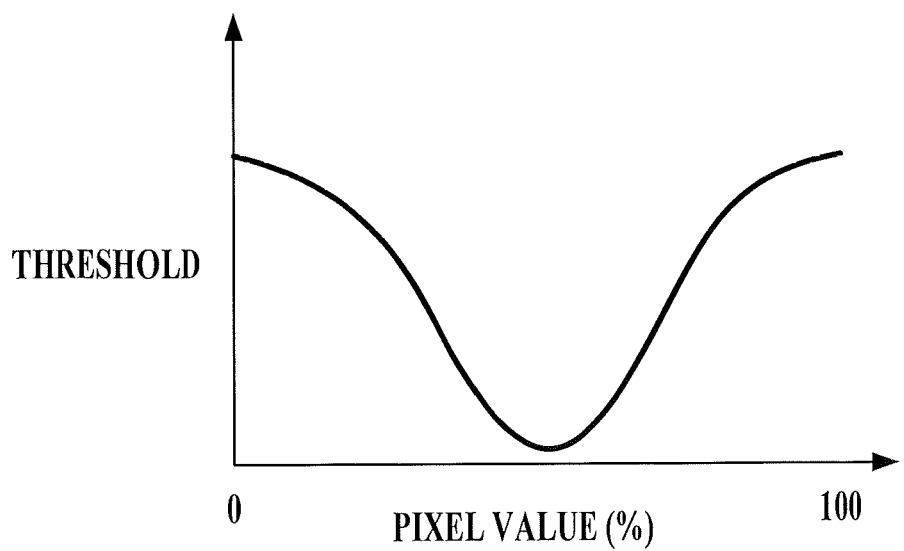
FIG. 4 illustrates another example of a characteristic curve used for determining a first threshold.

When a detection target is an image part that has a small density difference from the background, such as a solid blot on the halftone background, the first threshold Th1 that corresponds to the pixel value (%) of the target pixel may be determined according to the characteristic curve of FIG. 4. In the characteristic curve of FIG. 4, the determined first threshold Th1 becomes small when the pixel value is at a halftone around 50%. Since a feature point is more likely to be detected from a halftone image part with a smaller first threshold Th1, the sensitivity of detecting blots can be adjusted so that a halftone image part that is suspected to be a blot is detected as a feature point.

In FIG. 3 and FIG. 4, the pixel value (%) is shown in density level ranging from 0% to 100%.

The determining section 22 determines the target pixel as a feature point when the number of consecutive surrounding pixels having the same signal value representing "brighter", assigned by the ternarizing section 21 among the surrounding pixels, is equal to or greater than a second threshold or when the number of consecutive surrounding pixels having the same signal value representing "darker" is equal to or greater than the second threshold.

For example, when the surrounding pixels C1 to C7 and C13 to C16 have the signal value R[k] of 2 (brighter) among the surrounding pixels C1 to C16 in FIG. 2, the number of consecutive surrounding pixels having the signal value "2" representing "brighter" than the target pixel C0 is 11. When Th2=11, where Th2 is the second threshold, the number of consecutive surrounding pixels having the signal value "2" is not less than the second threshold Th2. Accordingly, the determining section 22 determines the target pixel C0 as a feature point.

The feature value calculating section 3 calculates the feature value of the one or more feature point detected by the feature point detecting section 2.

Specifically, the feature value calculating section 3 calculates feature value components of a plurality of directions as the feature value of the target pixel by using the respective signal values of surrounding pixels in the plurality of directions. Each feature value component is one of the three signal values.

The feature value calculating section 3 may set the signal values of all of the surrounding pixels as the feature value components of the respective directions from the target pixel to all of the surrounding pixels.

Figure 5:
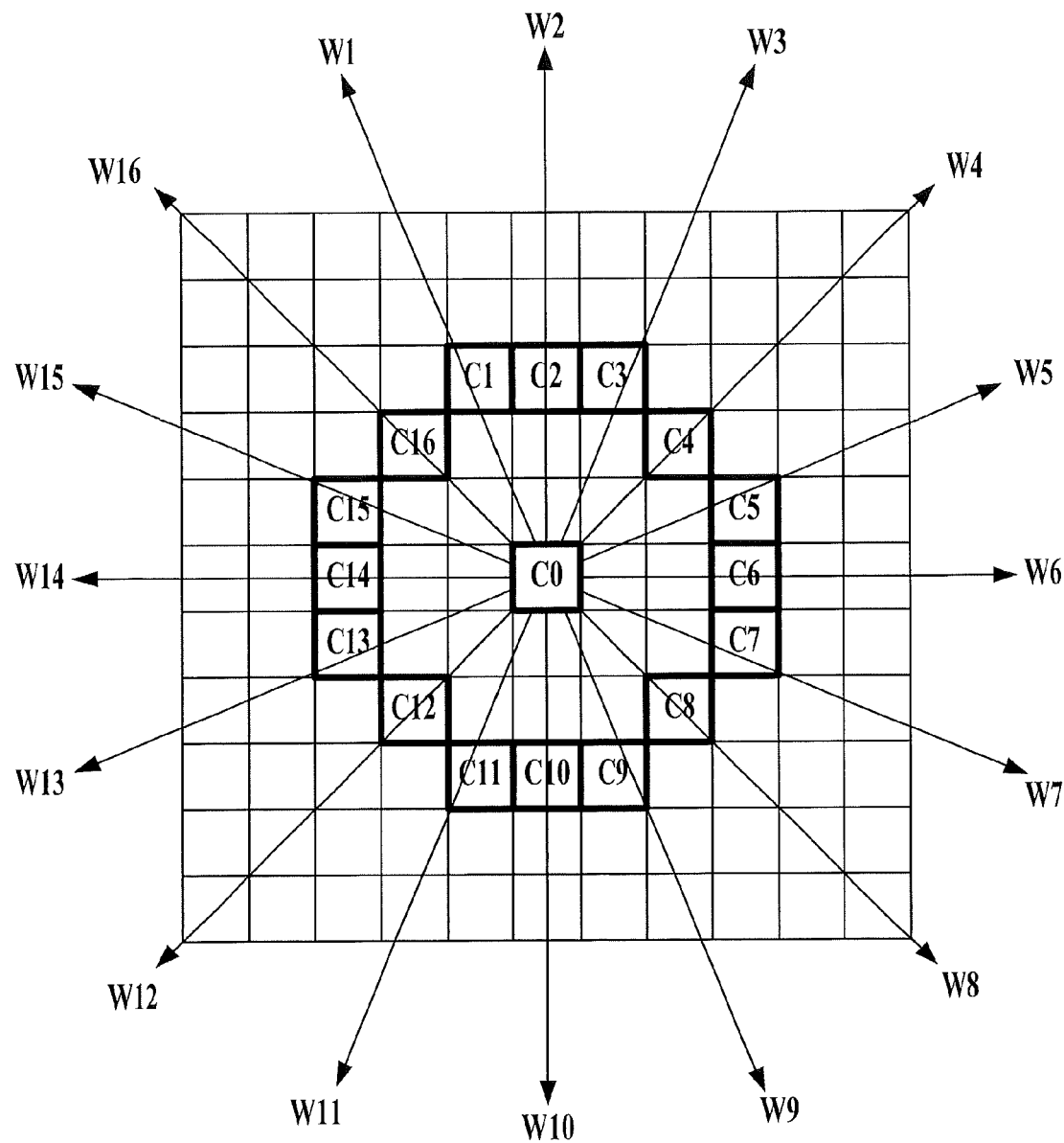
FIG. 5 illustrates a plurality of directions in which feature value components are calculated.

In the above-described surrounding pixels C1 to C16, the signal values R[k] of the surrounding pixels C1 to C16 may be set as the feature value components of sixteen directions W1 to W16 from the target pixel C0 to the surrounding pixels C1 to C16 as illustrated in FIG. 5. For example, the feature value component of the direction W1 is the signal value R[C1] of the surrounding pixel C1, and the feature value component of the direction W2 is the signal value R[C2] of the surrounding pixel C2. Since each feature value component of one direction is a 2-bit data as with the signal value, the total data volume of a feature value becomes as small as 32 bits even when the feature value includes data of all of the directions W1 to W16.

The number of the plurality of directions in which the feature value calculating section 3 calculates the feature value components may be reduced to be lower than the number of the surrounding pixels.

For example, the feature value components may be calculated only in the eight directions W2, W4, W6, W8, W10, W12, W14 and W16 among the sixteen directions W1 to W16 in FIG. 5.

This can reduce the data volume of the feature value and thus the volume of the storage for the feature value. Therefore, it becomes possible to reduce the cost.

It is preferred that angles between adjacent directions among the plurality of directions for calculating the feature value are the same.

In this case, the feature value components can be obtained in every constant angle and thus are prevented from a directional bias. Therefore, it is possible to obtain the feature value that provides the high accuracy of detecting a target image part. In the case of four directions for example, when the directions of feature value components are the directions W1, W2, W4 and W15 that have uneven angles with adjacent directions, there is no feature value component that represents an image characteristic of a down direction. In contrast, when the directions of the feature value components are the directions W2, W6, W10 and W14 in 90 degrees angular intervals, the obtained feature value components represent the image characteristics in all directions.

Therefore, the accuracy of detecting a target image part by using the feature value is improved.

When the number of the plurality of directions of the feature value components is fewer than the number of the surrounding pixels, the feature value calculating section 3 may set the feature value components of the plurality of directions as the signal values of the surrounding pixels located at the respective directions.

For example, the feature value components of the directions W2, W6, W10 and W14 in FIG. 5 may be determined as the signal values R[k] of the respective surrounding pixels C2, C6, C10 and C14 in the directions W2, W6, W10 and W14.

The feature value calculating section 3 may set the most frequent signal value among the signal value of a surrounding pixel in a direction in which the feature value component is calculated and other surrounding pixels in a predetermined distance from the surrounding pixel as the feature value component of the direction.

In this case, the feature value component in each direction can be calculated by integrating the signal values of surrounding pixels located around the direction. Therefore, even when the surrounding pixels include a noise, the influence of the noise on the feature value can be reduced.

For example, to obtain the feature value component of the direction W7 in FIG. 5, the most frequent signal value R[k] is selected as the feature value component of the direction W7 from the signal values R[C6] to R[C8] of the surrounding pixel C7 in the direction W7 and the surrounding pixels C6 and C8 included in a circle of a 1-pixel radius centered on the surrounding pixel C7. When the signal values R[C6] and R[C7] are 2 and the signal value R[C8] is 1, the most frequent signal value R[k] is 2. Accordingly, the feature value component of the direction W7 is set to 2.

Alternatively, the feature value calculating section 3 may set a weighted average of the signal values of a surrounding pixel in a direction in which the feature value component is calculated and other surrounding pixels located in a predetermined distance from the surrounding pixel as the feature value component in the direction.

Also in this case, the feature value component in each direction can be calculated by integrating the signal values of surrounding pixels located around the direction. Therefore, the influence of a noise included in the surrounding pixels on the feature value can be reduced.

For example, to calculate the feature value component of the direction W7 in FIG. 5, the weighted average of the signal values R[C6] to R[C8] of the surrounding pixel C7 in the direction W7 and the surrounding pixels C6 and C8 included in a circle of a 1-pixel radius centered on the surrounding pixel C7 is calculated as follows as the feature value component F[W7] of the direction W7.

$$F[W7]=(R[C6]+2\times R[C7]+R[C8])/4$$

When it is preferred that the feature value component largely reflects the signal value of the surrounding pixel in the same direction, the weight of the surrounding pixel C7 located in the direction of the feature value component may be set to the highest value among the surrounding pixels C6, C7 and C8 as in the above expression for calculating the weight average.

When it is preferred that the feature value component evenly reflects the signal value of the surrounding pixel in the same direction as well as the signal values of other surrounding pixels around the direction, the average of the signal values may be obtained. In the above expression, the weights of the surrounding pixels C6, C7 and C8 are changed to an even ratio of 1:1:1 so that the average of the signal values R[k] is calculated as the feature value component F[W7] of the direction W7.

It is preferred that the feature value calculating section 3 rounds off the weighted average of the signal values to the nearest number and sets the feature value component of each direction as the rounded value. By rounding off, the feature value components can be expressed as a data in the form of a power of two, which can be easily handled by hardware. Further, this can avoid a decrease of the accuracy of detecting a target image part, which is caused by rounding down the weighted average to the nearest number.

FIG. 6 illustrates a process of detecting the feature point and calculating the feature value in the image processing device 10.

As illustrated in FIG. 6, in the image processing device 10, when it is determined to convert the resolution of an image (Step S1, Y), the resolution converting section 1 coverts the resolution of the image (Step 2), and the process continues with Step S3. If it is determined not to convert the resolution (Step S1, N), the process continues with Step S3 without conversion of the resolution by the resolution converting section 1.

The ternarizing section 21 selects the first pixel among the pixels of the image as a target pixel and inputs the pixel values of the target pixel and surrounding pixels thereof (Step S3). If the resolution converting section 1 has converted the resolution, the converted image is used for the input.

Then, when the pixel value of a surrounding pixel is higher than that of the target pixel by the first threshold or more, the ternarizing section 21 changes the pixel value of the surrounding pixel to the signal value "0", which represents that the brightness is darker than that of the target pixel. When the pixel value of a surrounding pixel is lower than that of the target pixel by the first threshold or more, the ternarizing section 21 changes the pixel value of the surrounding pixel to the signal value "2", which represents that the brightness is brighter than that of the target pixel. When the difference in the pixel value between the target pixel and a surrounding pixel is less than the first threshold, the ternarizing section 21 changes the pixel value of the surrounding pixel to the signal value "1", which represents that the brightness is similar to that of the target pixel (Step S4). Alternatively, as described above, the signal value "0" may represent "brighter" and the signal value "2" may represent "darker".

When the number of consecutive surrounding pixels having the signal value "0" or "2", which has been changed by the ternarizing section 21, among the surrounding pixels is equal to or greater than the second threshold, the determining section 22 determines the target pixel as a feature point (Step S5).

If the target pixel is determined as a feature point, the feature value calculating section 3 calculates the feature value components of a plurality of directions from the target pixel as the feature value of the target pixel by using the signal values of surrounding pixels located in the plurality of directions (Step S6). As described above, the feature value components may be calculated in all of the directions from the target pixel to the surrounding pixels, or the feature value components may be calculated in fewer directions than all of the directions.

If the detection of the feature point and the calculation of the feature value have not performed on all pixels of the image (Step S7, N), the process returns to Step S3 and repeats Step S3 to Step S6 on the next unprocessed pixel as the target pixel. If the detection of the feature point and the calculation of the feature value has performed on all pixels of the image (Step S7, Y), the process ends.

As described above, the image processing device 10 of the present embodiment includes the feature point detecting section 2 which detects one or more feature point from an image, and the feature value calculating section 3 which calculates the feature value of the one or more feature point detected by the feature point detecting section 2. The feature point detecting section 2 includes the ternarizing section 21 and the determining section 22. The ternarizing section 21 sets each pixel of the image as a target pixel and inputs pixel values of the target pixel and surrounding pixels thereof and changes each of the pixel values of the surrounding pixels to one of the three signal values, which represents that the brightness of a surrounding pixel is brighter or darker than or similar to that of the target pixel, based on whether (i) the pixel values of a surrounding pixel is higher than that of the target pixel by the first threshold or more, (ii) the pixel value of a surrounding pixel is lower than that of the target pixel by the first threshold or more, or (iii) the difference in pixel value between the target pixel and a surrounding pixel is less than the first threshold. The determining section 22 determines the target pixel as the feature point when the number of consecutive surrounding pixels having the same signal value representing brighter or darker determined by the ternarizing section 21 among the surrounding pixels is equal to or greater than the second threshold. The feature value calculating section 3 calculates the feature value components of a plurality of directions from the target pixel as the feature value of the target pixel by using the signal values of surrounding pixels in the plurality of directions, in which each of the feature value components is one of the three signal values.

With this configuration, a feature point of a corner, in which brighter or darker surrounding pixels than the target pixel continues, can be detected at a high accuracy. Further, the signal values of surrounding pixels that are obtained in detecting the feature point can be utilized in calculating the feature value. Therefore, the calculation can be performed efficiently. Since the feature value is composed of the feature value components of a plurality of directions, it is possible to provide the feature value that represents the characteristics of the image well. Therefore, the accuracy of detecting a target image part by using the feature value can be improved. Since the feature value is one of the three signal values, each feature value component of one direction can be a small 2-bit data. Therefore, it is possible to reduce the storage volume required to store the feature value and thus to achieve a cost reduction.

The above-described embodiment is merely a preferred example of the present invention, and the present invention is not limited to the embodiment. Suitable changes can be made without departing from the scope of the present invention.

For example, the above-described process may be written as a program, and a computer such as a CPU (central processing unit) may read out the program to perform the process so that the feature point and the feature value are determined by means of software processing.

A non-volatile memory such as a ROM and a flash memory, a portable recording medium such as a CD-ROM, and the like are applicable as a computer-readable medium for the program. Further, a carrier wave is also applicable as a medium for providing the data of the program through a communication line.

This U.S. patent application claims priority to Japanese patent application No. 2014-178640 filed on Sep. 3, 2014, the entire contents of which are incorporated by reference herein for correction of incorrect translation.

What is claimed is:

1. An image processing device, comprising:
a feature point detecting section which detects one or more feature point from an image; and
a feature value calculating section which calculates a feature value of the feature point detected by the feature point detecting section,
wherein the feature point detecting section comprises:
a ternarizing section which sets a pixel of the image as a target pixel and inputs pixel values of the target pixel and surrounding pixels of the target pixel and which changes each of the pixel values of the surrounding pixels to one of three signal values based on whether (i) the pixel value of a surrounding pixel is higher than the pixel value of the target pixel by a first threshold or more, (ii) the pixel value of a surrounding pixel is lower than the pixel value of the target pixel by the first threshold or more, or (iii) a difference in the pixel value between the target pixel and a surrounding pixel is less than the first threshold, in which the three signal values represent that brightness of a surrounding pixel is brighter or darker than or similar to brightness of the target pixel; and
a determining section that determines the target pixel as the feature point when the number of consecutive surrounding pixels having a same signal value representing brighter or darker determined by the ternarizing section among the surrounding pixels is equal to or greater than a second threshold, and
wherein the feature value calculating section calculates feature value components of a plurality of directions from the target pixel as the feature value of the target pixel by using the signal values of surrounding pixels in the plurality of directions, in which each of the feature value components is one of the three signal values.

2. The image processing device according to claim 1, wherein the number of the plurality of directions is fewer than the number of the surrounding pixels.

3. The image processing device according to claim 2, wherein the feature value calculating section determines a most frequent value among the signal value of a surrounding pixel in a direction in which the feature value component is calculated and the signal values of other surrounding pixels located in a predetermined distance from the surrounding pixel as the feature value component of the direction.

4. The image processing device according to claim 2, wherein the feature value calculating section determines a weighted average of the signal value of a surrounding pixel in a direction in which the feature value component is calculated and the signal values of other surrounding pixels located in a predetermined distance from the surrounding pixel as the feature value component of the direction.

5. The image processing device according to claim 4, wherein the feature value calculating section rounds off the weighted average to a nearest number.

6. The image processing device according to claim 1, wherein the ternarizing section determines the first threshold according to the pixel value of the target pixel.

7. The image processing device according to claim 1, further comprising:
a resolution converting section which converts a resolution of the image according to a size of an image part to be detected from the image by using the feature value, wherein the feature point detecting section detects the feature point from the image converted by the resolution converting section.

8. The image processing device according to claim 1, wherein angles between adjacent directions among the plurality of directions are same.

9. An image processing method, comprising steps of:
(a) detecting one or more feature point from an image; and
(b) calculating a feature value of the feature point detected in the step (a),
wherein the step (a) comprises steps of:
 (a1) setting a pixel of the image as a target pixel and inputting pixel values of the target pixel and surrounding pixels of the target pixel;
 (a2) changing each of the pixel values of the surrounding pixels to one of three signal values based on whether (i) the pixel value of a surrounding pixel is higher than the pixel value of the target pixel by a first threshold or more, (ii) the pixel value of a surrounding pixel is lower than the pixel value of the target pixel by the first threshold or more, or (iii) a difference in the pixel value between the target pixel and a surrounding pixel is less than the first threshold, in which the three signal values represent that brightness of a surrounding pixel is brighter or darker than or similar to brightness of the target pixel; and
 (a3) determining the target pixel as the feature point when the number of consecutive surrounding pixels having a same signal value representing brighter or darker among the surrounding pixels is equal to or greater than a second threshold, and
wherein in the step (b), feature value components of a plurality of directions from the target pixel are calculated as the feature value of the target pixel by using the signal values of surrounding pixels located in the plurality of directions, in which each of the feature value components is one of the three signal values.

* * * * *